(12) United States Patent
Nakayama

(10) Patent No.: US 10,589,431 B2
(45) Date of Patent: Mar. 17, 2020

(54) STRAIN SENSOR, MULTI-AXIAL FORCE SENSOR AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/202,458

(22) Filed: Nov. 28, 2018

(65) Prior Publication Data
US 2019/0193281 A1 Jun. 27, 2019

(30) Foreign Application Priority Data
Dec. 25, 2017 (JP) ................. 2017-248251

(51) Int. Cl.
| | | |
|---|---|---|
| *G01L 5/00* | (2006.01) | |
| *G01L 1/22* | (2006.01) | |
| *B25J 13/08* | (2006.01) | |
| *G01L 5/162* | (2020.01) | |

(52) U.S. Cl.
CPC ............... *B25J 13/085* (2013.01); *G01L 1/22* (2013.01); *G01L 5/0019* (2013.01); *G01L 5/0061* (2013.01); *G01L 5/162* (2013.01)

(58) Field of Classification Search
CPC ........ B60N 2/002; B60N 2/7094; B60N 2/90; B60N 2/64; B60N 2/44; G01L 1/225; G01L 1/142; H01H 13/04; H01H 13/10; H01H 13/14; H01H 13/16; H01H 13/50; H01H 13/703; H01H 2231/026; G01G 19/08; G01G 19/12; G01G 19/52; G01G 23/02; G01G 23/06; G01G 3/00
See application file for complete search history.

(56) References Cited

U.S. PATENT DOCUMENTS

| 5,644,951 A | 7/1997 | Hatamura |
|---|---|---|
| 2006/0013515 A1 | 1/2006 | Rudy et al. |

(Continued)

FOREIGN PATENT DOCUMENTS

| JP | H05-138481 A | 6/1993 |
|---|---|---|
| JP | H05-288216 A | 11/1993 |

(Continued)

OTHER PUBLICATIONS

Decision to Grant a Patent dated Aug. 6, 2019, in corresponding Japanese Application No. 2017-248251; 6 pages.

(Continued)

*Primary Examiner* — Brandi N Hopkins
(74) *Attorney, Agent, or Firm* — Maier & Maier, PLLC

(57) ABSTRACT

Provided is a strain sensor which includes: a linear bearing including a first member and a second member which are supported such that the first member and the second member are relatively movable only in an axial direction of a predetermined axis; a connecting member including fixed portions, which are respectively fixed to the first member and the second member, and a strain generation portion which connects the fixed portions with each other; and a strain detecting element disposed on the connecting member so as to be capable of detecting strain in at least a moving direction.

15 Claims, 9 Drawing Sheets

(56) References Cited

U.S. PATENT DOCUMENTS

2010/0262383 A1* 10/2010 Isobe .................... F16C 19/186
                                                      702/42
2018/0215054 A1   8/2018 Brudniok
2018/0292277 A1* 10/2018 Nakayama .............. F16C 19/02

FOREIGN PATENT DOCUMENTS

| JP | 2007-88154 A  | 4/2007  |
|----|---------------|---------|
| JP | 4445957 B2    | 4/2010  |
| JP | 2018-179965 A | 11/2018 |
| WO | 2017/016939 A1| 2/2017  |

OTHER PUBLICATIONS

Chinese Office Action dated Nov. 1, 2019, in connection with corresponding CN Application No. 201811545231.5 (13 pgs., including machine-generated English translation).

* cited by examiner

STRAIN SENSOR, MULTI-AXIAL FORCE SENSOR AND ROBOT

CROSS-REFERENCE TO RELATED APPLICATIONS

This application claims the benefit of Japanese Patent Application No. 2017-248251, the content of which is incorporated herein by reference.

FIELD

The present invention relates to a strain sensor, a multi-axial force sensor and a robot.

BACKGROUND

Conventionally, as a strain sensor which detects strain in an axial direction, a strain sensor has been known which is disposed between a nut disposed in a movable manner in an axial direction of a feed screw shaft and a movable table fixed to the nut so as to detect strain acting between the nut and the movable table (see Japanese Unexamined Patent Application, Publication No. Hei5-138481, for example). For a joint of a robot on which loads in various axial directions act, in order to detect the loads in the axial directions which act on the joint with high accuracy, a strain cancellation mechanism is formed of a bridge circuit which uses a large number of strain sensors capable of detecting strain in the axial directions, and loads in axial directions other than a specific axial direction along which detection is expected are excluded.

SUMMARY

According to one aspect of the present invention, there is provided a strain sensor which includes: a linear bearing including a first member and a second member which are supported such that the first member and the second member are relatively movable only in an axial direction of a predetermined axis; a connecting member including fixed portions, which are respectively fixed to the first member and the second member, and a strain generation portion which connects the fixed portions with each other; and a strain detecting portion disposed on the connecting member so as to be capable of detecting strain in at least a moving direction.

DETAILED DESCRIPTION

A strain sensor 1 and a robot 100 according to one embodiment of the present invention will be described hereinafter with reference to drawings.

Figure 1:
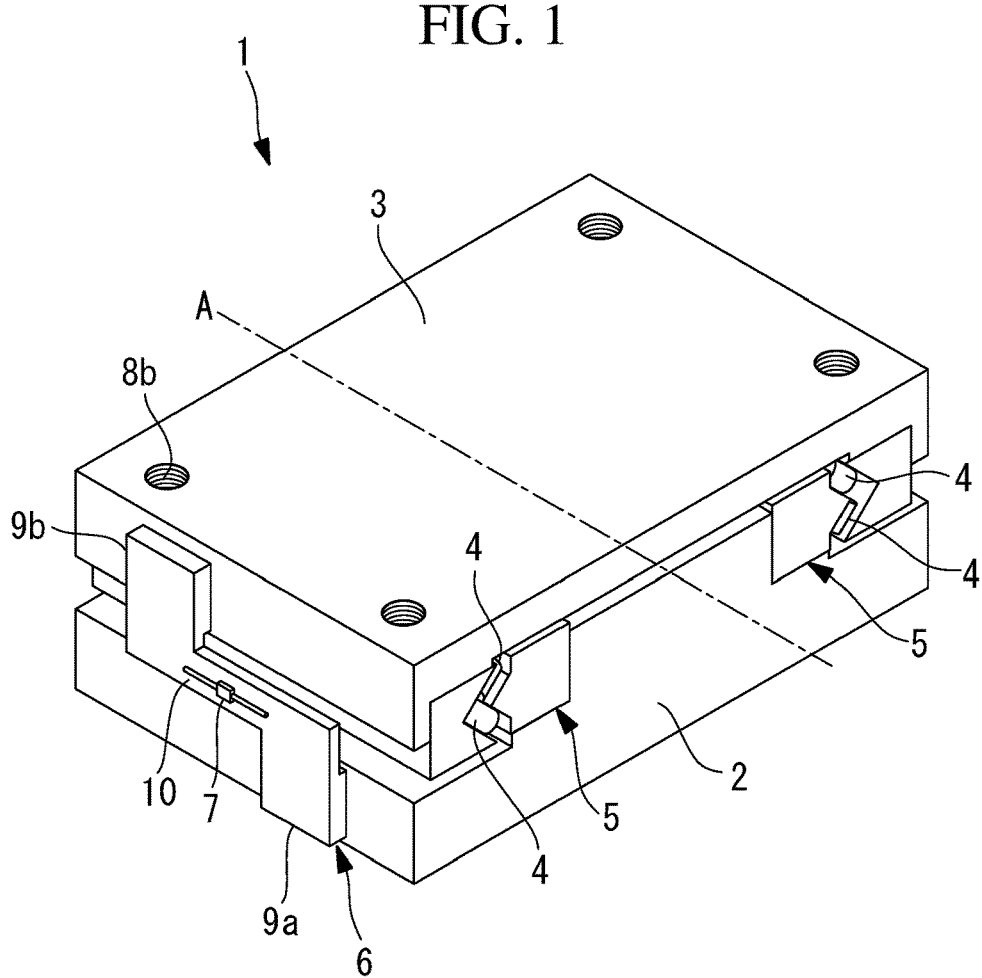
FIG. 1 is a perspective view showing a strain sensor according to one embodiment of the present invention.
Figure 2:
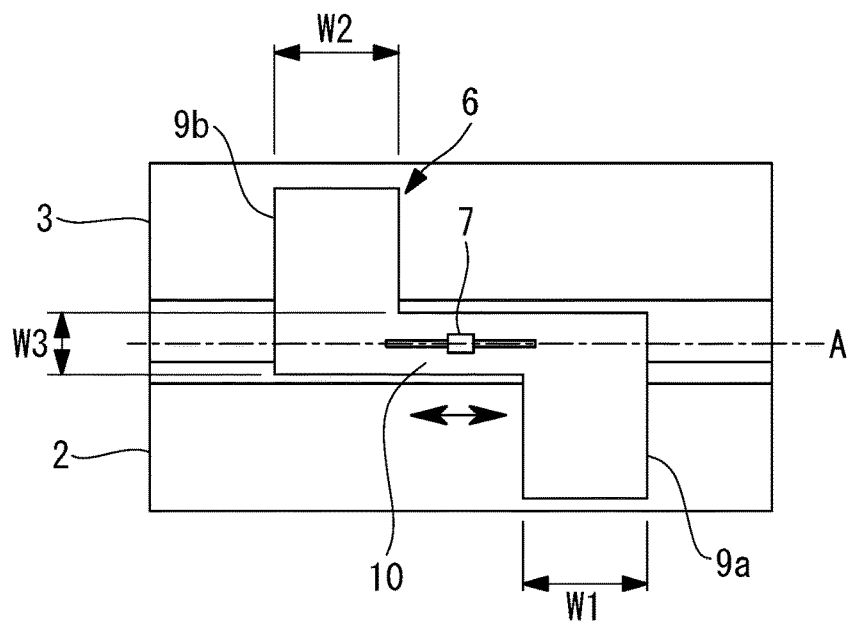
FIG. 2 is a front view showing the strain sensor shown in FIG. 1.
Figure 3:
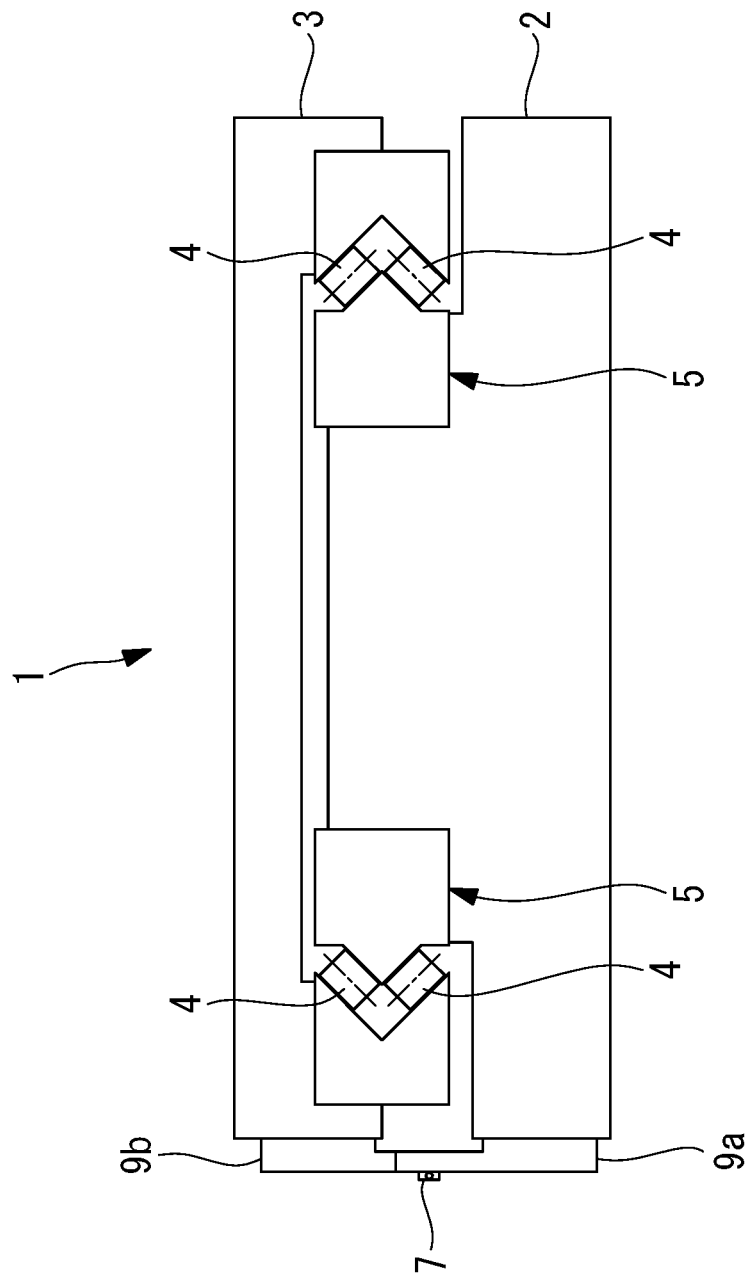
FIG. 3 is a side view showing the strain sensor shown in FIG. 1.

As shown in FIG. 1 to FIG. 3, the strain sensor 1 according to this embodiment includes a linear roller bearing (linear bearing) 5, a connecting member 6, and a uniaxial strain sensor part (strain detecting portion) 7. The linear roller bearing 5 includes: a first member 2 and a second member 3, which are disposed adjacent to each other in the height direction; and a plurality of linear rollers 4 which are arranged between the first member 2 and the second member 3 at intervals in the direction of an axis A orthogonal to the height direction. The connecting member 6 is fixed to each of the first member 2 and the second member 3. The uniaxial strain sensor part 7 is fixed to the connecting member 6.

As shown in FIG. 1, a plurality of screw holes (fixing portions) 8b are formed in the second member 3 so as to extend along the height direction to fix the second member 3 to an object to be detected. Although not shown in FIG. 1, substantially the same screw holes (fixing portions) 8b are also formed in a lower surface of the first member 2.

As shown in FIG. 1 and FIG. 3, the connecting member 6 is formed into a flat plate shape so as to be disposed along end surfaces of the first member 2 and the second member 3 which are substantially parallel to the direction of the axis A of the linear roller bearing 5. The connecting member 6 has fixed portions 9a, 9b which are respectively fixed to side surfaces of the first member 2 and the second member 3, and a strain generation portion 10 which connects the fixed portions 9a, 9b with each other.

The fixed portion 9a is fixed to the first member 2, and the fixed portion 9b is fixed to the second member 3. In the example shown in FIG. 2, the fixed portion 9a has a width dimension W1, and the fixed portion 9b has a width dimension W2 in the direction of the axis A. The fixed portion 9a and the fixed portion 9b are disposed at different positions in the axial direction. The fixed portion 9a, fixed to the first member 2, extends upward in the height direction. The fixed portion 9b, fixed to the second member 3, extends downward in the height direction. The strain generation portion 10, which connects the fixed portions 9a, 9b with each other, has a width dimension W3 in the height direction, and is disposed at a position sandwiched between the fixed portions 9a, 9b in the direction of the axis A in the vicinity of a boundary position between the first member 2 and the second member 3. The strain generation portion 10 connects both fixed portions 9a, 9b with each other.

The transverse cross-sectional area of the strain generation portion 10 is set sufficiently small compared to the transverse cross-sectional area of the fixed portion 9a, 9b. With such setting, when a tensile force or a compressive force (hereinafter also simply referred to as "axial force"), which causes the first member 2 and the second member 3 to move relative to each other in the direction of the axis A, acts between the first member 2 and the second member 3 as indicated by arrows in FIG. 2, strain is solely generated at the strain generation portion 10.

The uniaxial strain sensor part 7 is caused to adhere to a surface of the strain generation portion 10 such that the detection direction of the uniaxial strain sensor part 7 is made to coincide with the direction along which the axial force acts. Wiring not shown in the drawing is connected to the uniaxial strain sensor part 7, and the uniaxial strain sensor part 7 outputs a voltage signal proportional to the amount of strain generated at the strain generation portion 10. With such a configuration, an axial force generated at the strain generation portion 10 can be acquired based on the voltage signal outputted from the uniaxial strain sensor part 7. For the uniaxial strain sensor part 7, a semiconductor strain gauge, a metal foil strain gauge or the like may be used. The sensor may be of a type which is fixed by bolts. Alternatively, the sensor may be formed of a displacement detection device, such as a laser displacement sensor, a laser proximity sensor, or a proximity sensor of an electrostatic capacity type. Any sensor may be adopted provided that the sensor can detect the amount of strain from a distance between the sensor and a counterpart member. In this case, the projector side of the displacement detection device and a wall-like member, which is the counterpart, are required to be disposed on the same strain generation portion 10.

The operation of the strain sensor 1 according to this embodiment having such a configuration is described hereinafter.

In this embodiment, the case will be described where an axial force which acts on a joint shaft of the robot 100 is detected using the strain sensor 1 according to this embodiment.

Figure 4:
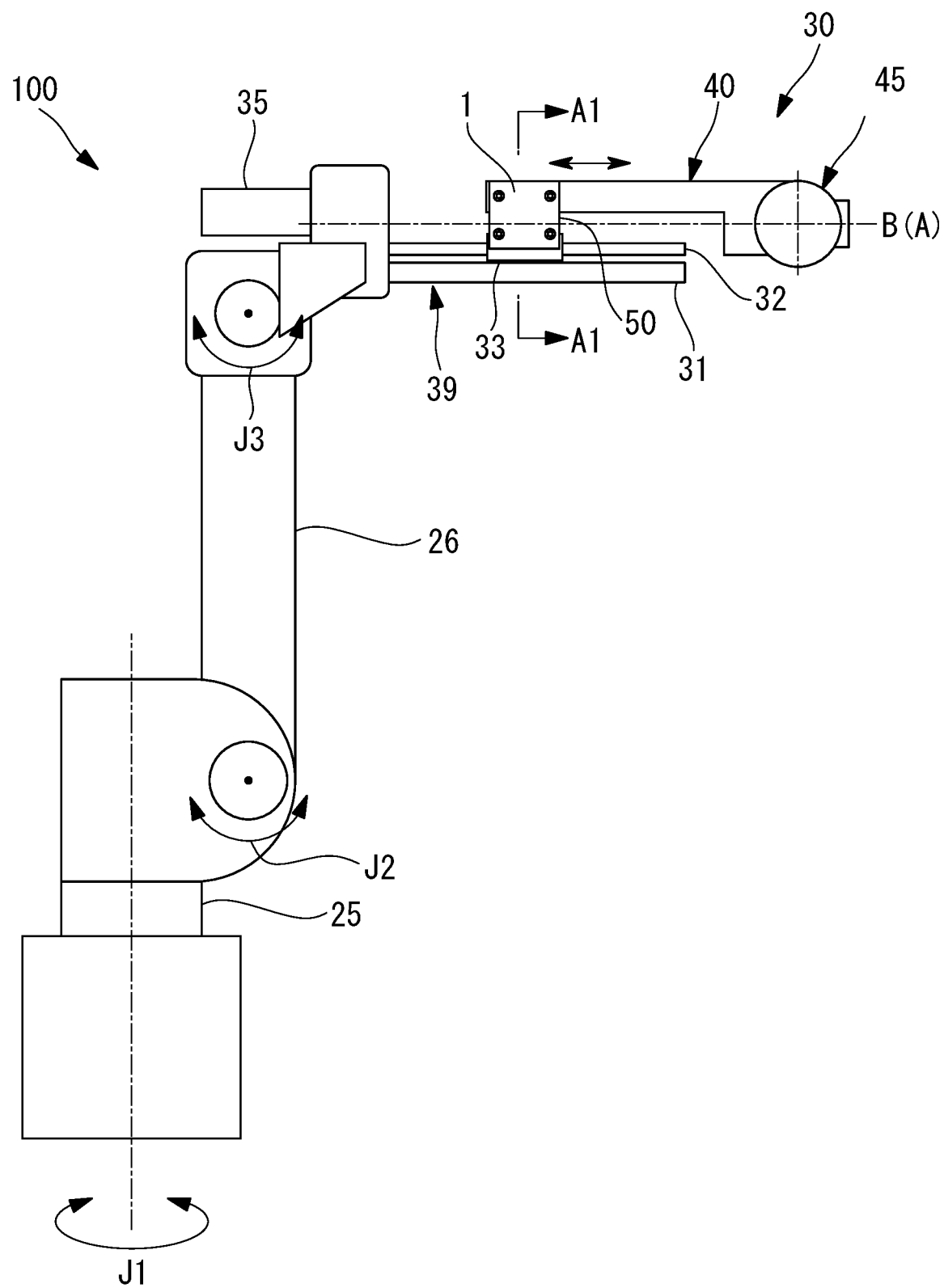
FIG. 4 is a view showing an example where the strain sensor shown in FIG. 1 is mounted on a linear motion shaft of a linear motion arm of a robot.

As shown in FIG. 4, the robot 100 is a vertical articulated robot which includes: a revolving body 25; a first arm 26; a second arm 30; and a wrist unit 45. The revolving body 25 is rotatable about a vertical first axis J1. The first arm 26 is rotatable about a horizontal second axis J2 with respect to the revolving body 25. The second arm 30 is disposed at a distal end of the first arm 26, and is rotatable about a horizontal third axis J3. The wrist unit 45 is disposed at a distal end of the second arm 30. The second arm 30 includes an elongated base member 39 and a linear motion arm 40 (object to be detected) 40. The base member 39 is mounted at the distal end of the second arm 30 in a rotatable manner about the third axis J3. The linear motion arm 40 is supported in a movable manner in the longitudinal direction of the base member 39, and the wrist unit 45 is supported on a distal end of the linear motion arm 40.

The linear motion arm 40 is caused to move in the longitudinal direction with respect to the base member 39 by a linear motion mechanism. The linear motion mechanism includes a linear guide 31, a slider 33, a ball screw 32, and a motor 35. The linear guide 31 extends along the longitudinal direction (linear motion axis) B of the base member 39. The slider 33 is movable along the linear guide 31. The ball screw 32 meshes with a nut fixed to the slider 33. The motor 35 causes the ball screw 32 to rotate about a longitudinal axis.

Figure 5:
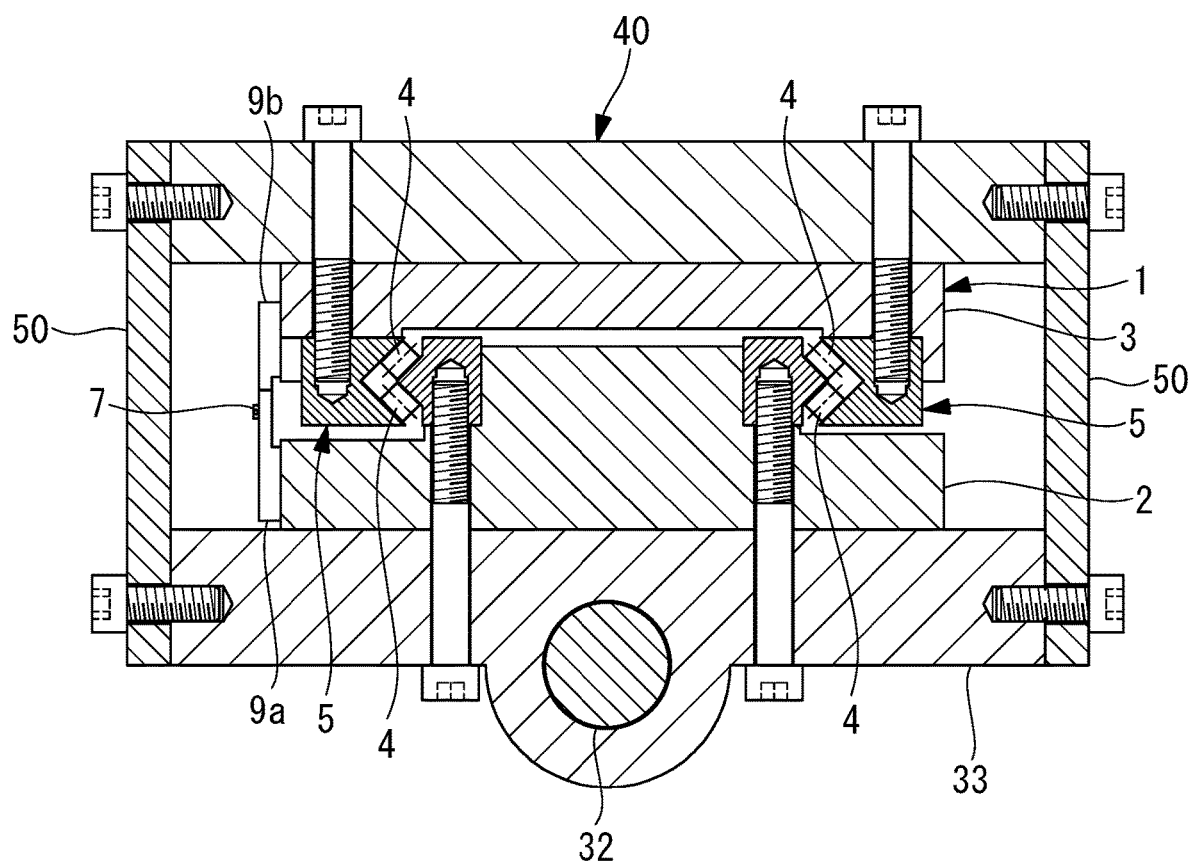
FIG. 5 is a cross-sectional view showing the strain sensor shown in FIG. 1 which is mounted on the linear motion arm of the robot.

As shown in FIG. 4 and FIG. 5, the linear motion arm 40 and the slider 33 are firmly fixed by a mounting plate 50. At the same time, the strain sensor 1 according to this embodiment is fixed between the linear motion arm 40 and the slider 33. The strain sensor 1 is fixed such that the axis of the linear roller bearing 5 is made to coincide with the longitudinal direction B of the base member 39.

When the ball screw 32 is rotated by operating the motor 35, the slider 33, to which the nut meshing with the ball screw 32 is fixed, is caused to linearly move along the linear guide 31. With such movement, the linear motion arm 40 is caused to move in the longitudinal direction with respect to the base member 39 of the second arm 30. When the linear motion arm 40 is caused to move, a load acts on the linear motion arm 40 so that an axial force along the longitudinal direction B acts on the strain sensor 1. Due to such an axial force, the first member 2 and the second member 3 of the linear roller bearing 5, which forms the strain sensor 1, is minutely displaced along the longitudinal direction B. Accordingly, due to such displacement, the axial force acts on the strain generation portion 10 disposed between the fixed portions 9a, 9b of the connecting member 6, causing the strain generation portion 10 to deform. Due to such deformation, the uniaxial strain sensor part 7, which is caused to adhere to the strain generation portion 10, detects the amount of strain so that a tensile force or a compressive force can be detected based on the detected amount of strain.

In this case, according to the strain sensor 1 of this embodiment, the connecting member 6, which includes the strain generation portion 10, is fixed so as to extend between the first member 2 and the second member 3 of the linear roller bearing 5, and the first member 2 and the second member 3 are supported so as to move relative to each other only in the direction of the axis A. Accordingly, even when loads in various directions act on the linear motion arm 40 of the robot 100, a tensile force or a compressive force only in the axial direction along the longitudinal direction B acts on the strain generation portion 10 on which the uniaxial strain sensor part 7 is mounted.

That is, according to the strain sensor 1 of this embodiment, it is possible to acquire an advantageous effect that even when loads in various directions act on the linear motion arm 40, the strain sensor 1 can detect, with high accuracy, only a tensile force and a compressive force which act along the longitudinal direction B.

As a result, even without adopting a multi-axial strain cancellation mechanism which uses a bridge circuit, where expensive strain sensors are adhered for many directions, a tensile force and a compressive force along the axial direction can be detected with high accuracy without detecting the amount of strain which is generated due to loads in directions other than the axial direction. Accordingly, costs can be suppressed to a low level. Costs can be effectively reduced particularly when strain sensors are installed on all joint shafts of an articulated robot.

In this embodiment, the sensor has been exemplified where the amount of strain at the strain generation portion 10 is detected by the uniaxial strain sensor part 7. However, a sensor which detects the amount of strain is not always limited to a uniaxial strain sensor. The sensor is not always limited to a uniaxial strain sensor, and a strain sensor may be adopted which detects the amount of strain at the strain generation portion 10.

According to the strain sensor 1 of this embodiment, the uniaxial strain sensor part 7 is mounted on the connecting member 6 between the first member 2 and the second member 3, and the connecting member 6 is formed into a flat plate shape which is disposed along the side surfaces of the first member 2 and the second member 3 extending parallel to the axial direction. Accordingly, the connecting member 6 has a compact configuration which slightly projects in the cross-sectional direction orthogonal to the axial direction of the linear roller bearing 5. With such a configuration, the strain sensor 1 can be mounted on a joint shaft of the robot 100 by making use of a gap in the vertical direction which is formed at a portion where the slider 33 and the linear motion arm 40 are mounted.

According to the robot 100 where the strain sensor 1 of this embodiment is mounted on each joint shaft, it is possible to acquire an advantageous effect that even when loads in a plurality of directions act on a distal end of the robot 100, an axial force which acts on each joint shaft can be acquired with high accuracy, thus allowing the robot 100 to be controlled. For example, a multi-axial force sensor, which can detect axial forces in a plurality of axial directions, may be provided to one or more of a plurality of arms of the robot 100, and the strain sensors 1, the number of which corresponds to the number of corresponding axial directions, may be used so as to detect one or two or more axial forces in the plurality of axial directions. In this case, the axial directions, which the strain sensor 1 can detect, may be made to coincide with the axial directions which are desired to be detected by the multi-axial force sensor.

Figure 6:
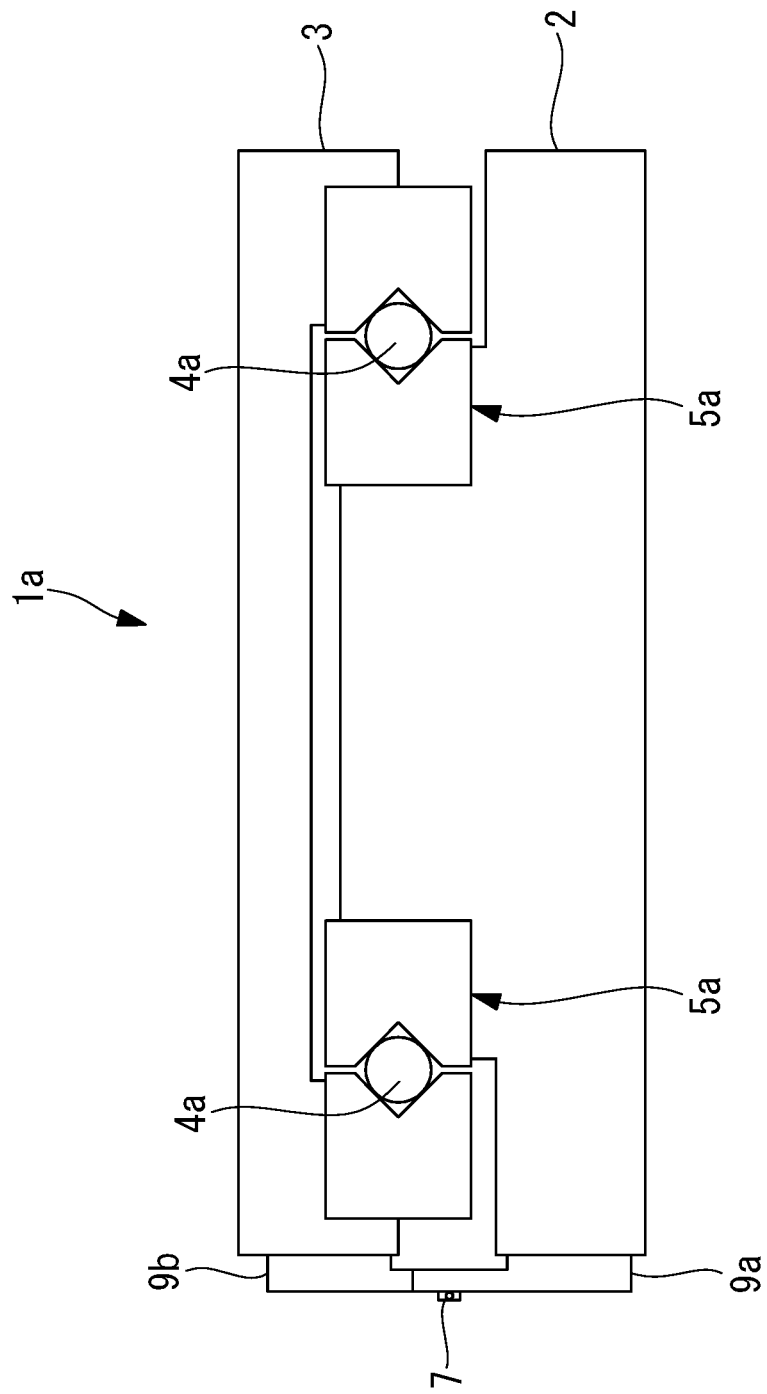
FIG. 6 is a side view showing a modification of the strain sensor shown in FIG. 1.

In this embodiment, the linear roller bearing 5 is used as a bearing. However, the bearing is not limited to the linear roller bearing 5. Provided that the bearing is supported such that the first member 2 and the second member 3 can be moved relative to each other only in a predetermined direction of the axis A, a bearing of another kind may be adopted, such as a linear ball bearing 5a shown in FIG. 6 which includes balls 4a, or a sliding bearing. Particularly, the amount of relative displacement between the first member 2 and the second member 3 for detecting an axial force is extremely small and hence, a sliding bearing having a simple structure may be used. In such a case, further cost reduction can be realized.

In this embodiment, the uniaxial strain sensor part 7 may be configured to correct fluctuation in amount of strain caused by variation in ambient temperature.

When an ambient temperature in the vicinity of the strain generation portion 10 of the connecting member 6 varies, the amount of strain varies corresponding to the amount of variation in temperature. However, with the above-mentioned configuration, the amount of strain is corrected by an amount which corresponds to the amount of variation in ambient temperature and hence, accuracy in detecting strain can be further enhanced.

In this embodiment, as the uniaxial strain sensor part 7, the sensor has been exemplified which is caused to adhere to the surface of the strain generation portion 10. However, a sensor may be adopted which is fixed by screw-fastening instead.

Further, the case has been exemplified where the strain sensor 1 includes the single uniaxial strain sensor part 7. However, two or more uniaxial strain sensor parts 7 may be arranged in a row on the strain generation portion 10 to detect a malfunction. The uniaxial strain sensor parts 7 may be arranged in series or in parallel.

By adopting the configuration where the two or more uniaxial strain sensor parts 7 are arranged, it is possible to know whether or not one uniaxial strain sensor part 7 is in a normal state by comparing strain data from the one uniaxial strain sensor part 7 with strain data from another uniaxial strain sensor part 7. Even if a malfunction occurs in the one uniaxial strain sensor part 7, the robot 100 can be quickly stopped safely using strain information from the remaining normal uniaxial strain sensor part 7 which is not malfunctioning.

Figure 7:
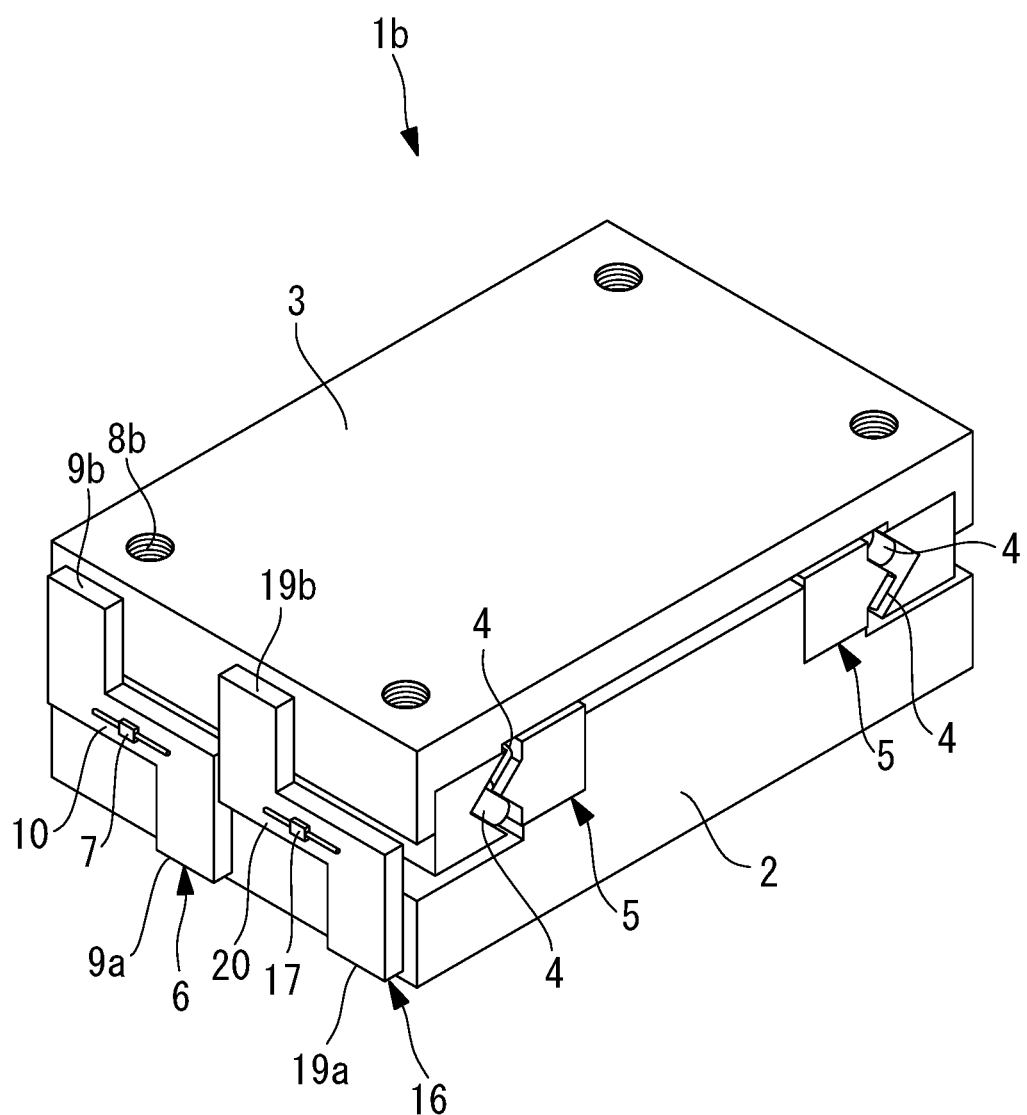
FIG. 7 is a perspective view showing a modification of the strain sensor shown in FIG. 1.

FIG. 7 shows a strain sensor 1b of a modification which includes two connecting members 6, 16. Compared with the strain sensor 1 of the embodiment, as shown in FIG. 7, the strain sensor 1b further includes, in addition to the connecting member 6, the connecting member 16 to which a uniaxial strain sensor part (strain detecting portion) 17 is fixed. The connecting member 16 has the same configuration as the connecting member 6, and the uniaxial strain sensor part 17 has the same configuration as the uniaxial strain sensor part 7. The connecting member 16 is disposed such that the direction of the axis of the uniaxial strain sensor part 17 coincides with the direction of the axis of the uniaxial strain sensor part 7. Accordingly, the uniaxial strain sensor part 17 can detect the amount of strain generated at the connecting member 16.

As described above, the strain sensor 1b of the modification shown in FIG. 7 includes the two connecting members 6, 16 and the two uniaxial strain sensor parts 7, 17 along the direction of the same axis, thus outputting detection values of a plurality of systems. In the modification shown in FIG. 7, an example has been described where the strain sensor 1b includes the two connecting members 6, 16 and the two uniaxial strain sensor parts 7, 17. However, a strain sensor of another embodiment may include three or more connecting members and three or more uniaxial strain sensor parts. Further, the two connecting members 6, 16 may have the same shape, and the two uniaxial strain sensor parts 7, 17 may be identical to each other.

Figure 8:
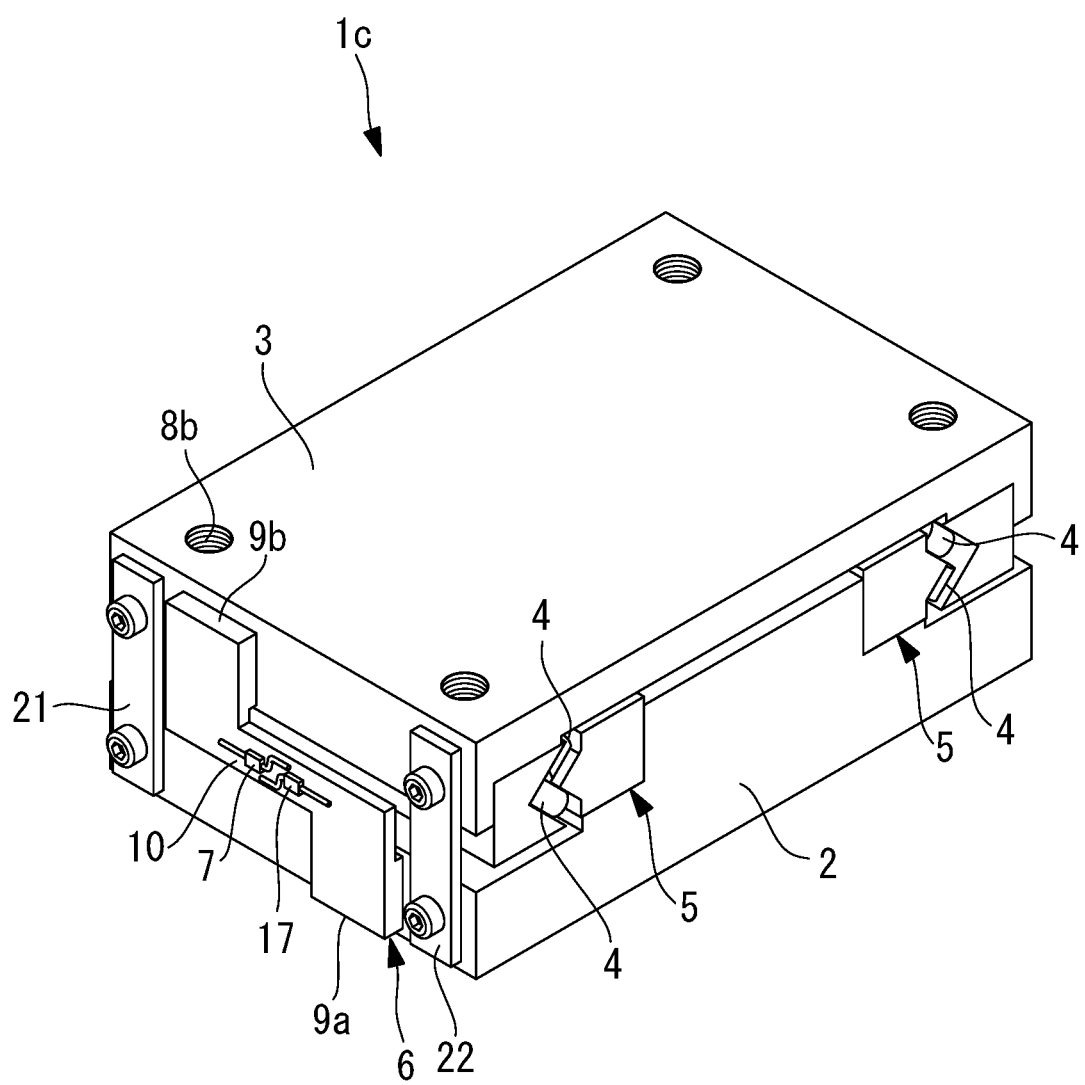
FIG. 8 is a perspective view showing a modification of the strain sensor shown in FIG. 1.

FIG. 8 shows a strain sensor 1c of a modification. The strain sensor 1c includes two reinforcing members 21, 22 each of which is fixed to a first member 2 and a second member 3 to connect the first member 2 and the second member 3 with each other. Two uniaxial strain sensor parts 7, 17 are disposed on a connecting member 6. Each of the reinforcing members 21, 22 is fixed to the first member 2 and the second member 3 by fastening bolts and hence, the amount of strain generated at the connecting member 6 is smaller than the amount of strain generated at the connecting member 6 fixed to the strain sensor 1 of the embodiment. Accordingly, detection values of the uniaxial strain sensor parts 7, 17 which are disposed on the connecting member 6 can be adjusted by the reinforcing members 21, 22. The two uniaxial strain sensor parts 7, 17 may be identical to each other.

Unlike the strain sensor 1c shown in FIG. 8, a strain sensor of another embodiment may include three or more uniaxial strain sensor parts disposed on one connecting member 6, or may include one or three or more reinforcing members. The reinforcing members 21, 22 shown in FIG. 8 have been described as one example of the reinforcing members which the strain sensor includes. However, provided that the reinforcing member provided to the strain sensor has a shape which allows the reinforcing member to be fixed to the first member 2 and the second member 3, the shape of the reinforcing member can be variously modified. For example, the reinforcing member may have the same shape as the connecting member 6 shown in FIG. 8, a disk shape or any other shape. The reinforcing members may be disposed on a side surface of the strain sensor 1c on the side opposite to a side surface of the strain sensor 1c on which the connecting member 6 is disposed.

Figure 9:
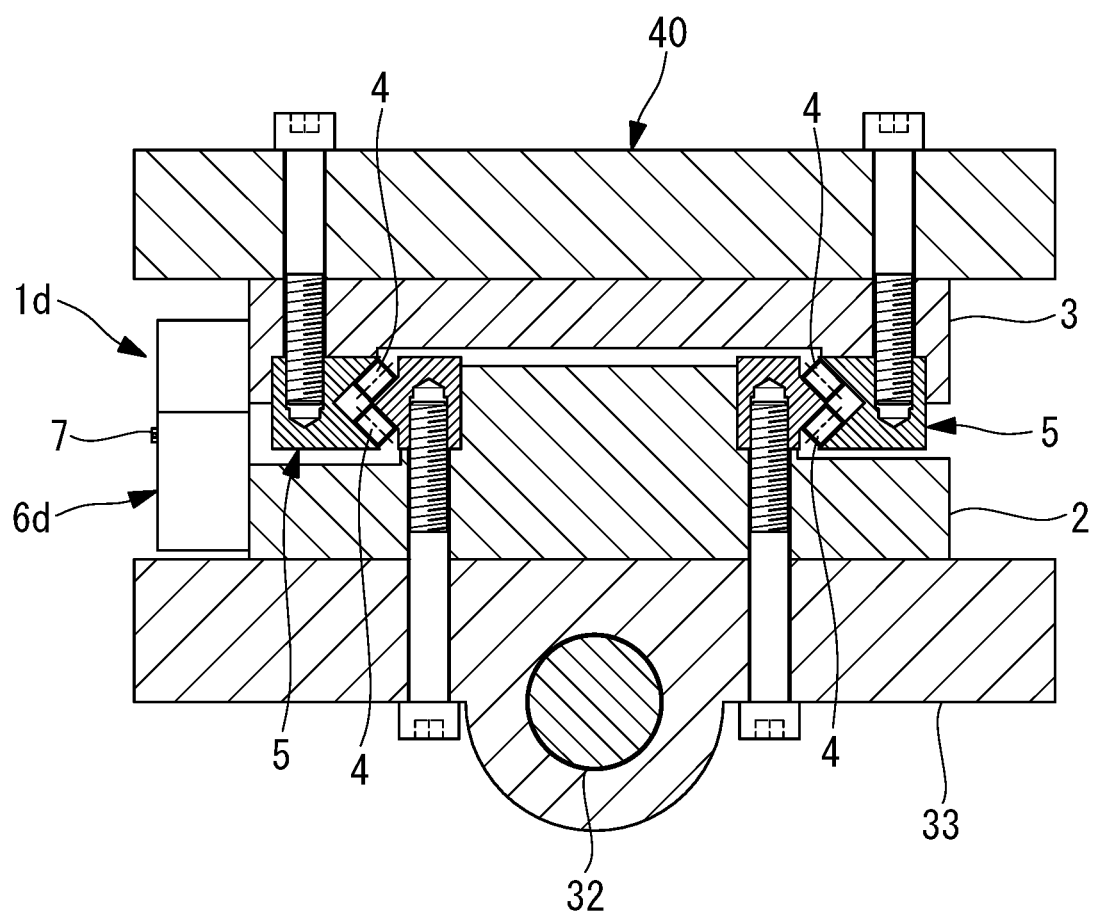
FIG. 9 is a cross-sectional view showing a modification of the strain sensor shown in FIG. 1 which is mounted on the linear motion arm of the robot.

In the robot 100 shown in FIG. 4 and FIG. 5, the slider 33 of the second arm 30 and the linear motion arm 40 are fixed with each other by the mounting plate 50. However, as shown in FIG. 9, the slider 33 and the linear motion arm 40 may be fixed with each other only by a strain sensor 1d. In this case, the strain sensor 1d receives all load of the linear motion arm 40. Accordingly, the strain sensor 1d may be formed such that the thickness of a connecting member 6d along the horizontal direction is larger than that in the strain sensor 1 shown in FIG. 4 and FIG. 5.

Figure 10:
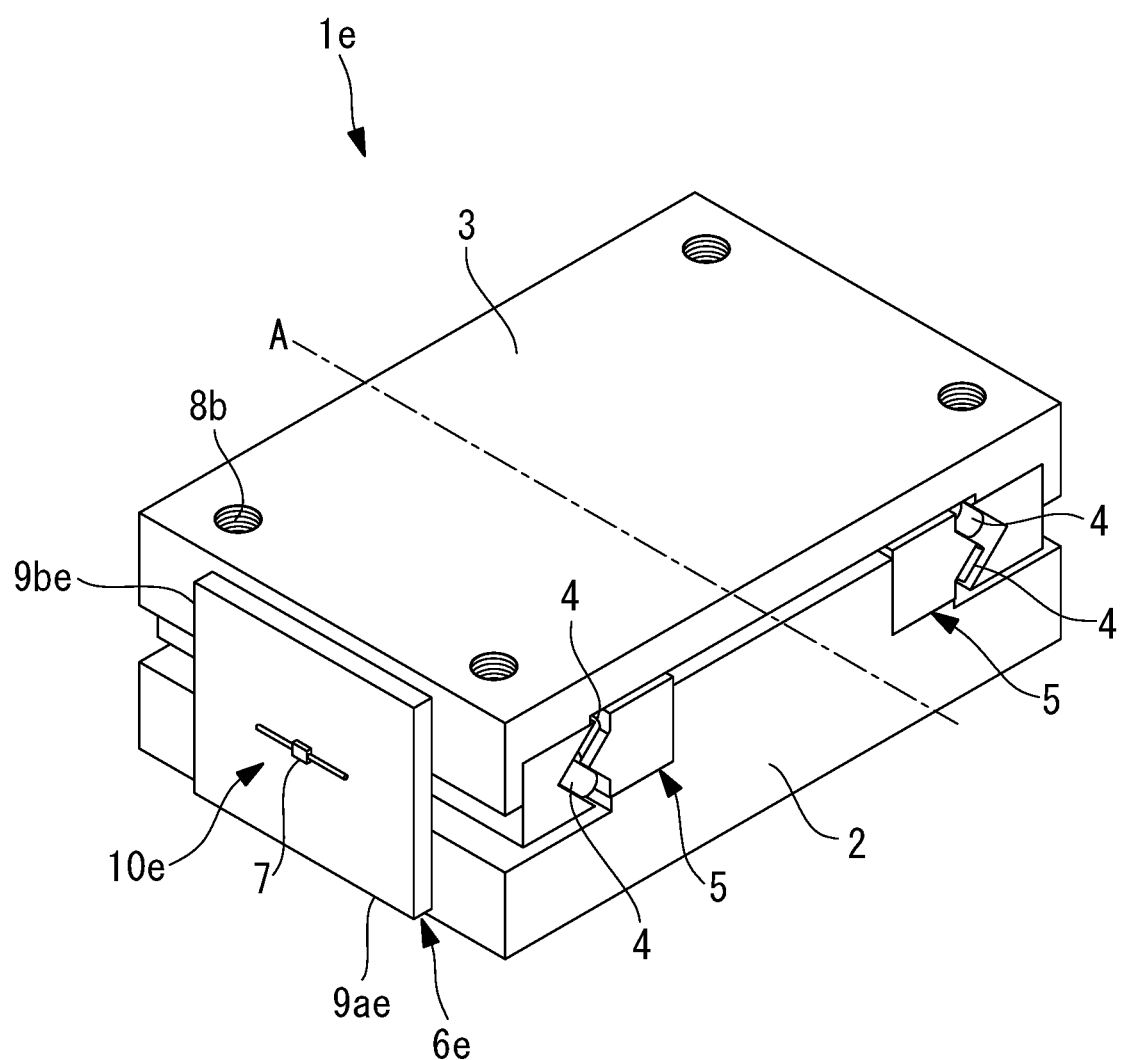
FIG. 10 is a perspective view showing a modification of the strain sensor shown in FIG. 1.

With respect to the strain sensor 1 of the above-mentioned embodiment, the connecting member 6 has been described where a transverse cross-sectional area of the fixed portion 9a, 9b is larger than a transverse cross-sectional area of the strain generation portion 10. However, the relationship between transverse cross-sectional areas of respective portions of the connecting member 6 can be variously modified. For example, as shown in FIG. 10, a connecting member 6e of a strain sensor 1e of a modification has a rectangular shape as viewed in a front view. As an extreme example, a connecting member may have a flat plate shape which covers the whole side surfaces of a first member 2 and a second member 3. Unlike the strain generation portion 10 of the strain sensor 1 shown in FIG. 1, a strain generation portion 10e, where the uniaxial strain sensor 7 detects strain, may not be formed with a small transverse cross-sectional area compared with other portions of the connecting member. In another modification, a transverse cross-sectional area of a strain generation portion (e.g. 10, 10e) of a connecting member may be set larger than a transverse cross-sectional area of a fixed portion (e.g. 9a, 9ae, 9b, 9be, 19a, 19b) of the connecting member 6e.

From the above-described embodiment, the following invention is derived.

According to one aspect of the present invention, there is provided a strain sensor (e.g. 1, 1a, 1b, 1c, 1d, 1e) which includes: a linear bearing 5 including a first member 2 and a second member 3 which are supported such that the first member 2 and the second member 3 are relatively movable only in an axial direction of a predetermined axis A; a connecting member (e.g. 6, 6d, 6e, 16) including fixed portions (e.g. 9a, 9ae, 9b, 9be, 19a, 19b), which are respectively fixed to the first member 2 and the second member 3, and a strain generation portion (e.g. 10, 10e) which connects the fixed portions (e.g. 9a, 9ae, 9b, 9be, 19a, 19b) with each other; and a strain detecting portion (e.g. 7, 17) disposed on the connecting member (e.g. 6, 6d, 6e, 16) so as to be capable of detecting strain in at least a moving direction.

According to this aspect, the first member 2 and the second member 3 are disposed so as to straddle over a portion to which an axial force is transmitted, and the first member 2 and the second member 3 are fixed to an object to be detected such that the axis is made to coincide with an axis of the object to be detected which is moved along the predetermined axial direction. Accordingly, with the application of a load to the object to be detected, the first member 2 and the second member 3 move relative to each other, thus generating strain at the strain generation portion (e.g. 10, 10e) of the connecting member (e.g. 6, 6d, 6e, 16). An amount of such strain is detected by the strain detecting portion (e.g. 7, 17) and hence, a load in the axial direction of the linear bearing 5 which acts on the object to be detected can be acquired based on the detected amount of strain.

In this case, the first member 2 and the second member 3 of the linear bearing 5 are supported such that the first member 2 and the second member 3 are relatively movable only in the axial direction along which the first member 2 and the second member 3 are movable. Accordingly, also in the case where the strain sensor 1e is mounted on a joint of a robot on which loads in various axial directions act, it is possible to prevent loads in directions other than the moving direction of the linear bearing 5 from acting on the strain generation portion (e.g. 10, 10e) of the connecting member (e.g. 6, 6d, 6e, 16). As a result, even without forming a strain cancellation mechanism using a bridge circuit which uses a plurality of strain gauges, strain in the axial direction along which the first member 2 and the second member 3 are movable can be detected with high accuracy.

In the above-mentioned aspect, a transverse cross-sectional area of the strain generation portion (e.g. 10, 10e) may be set smaller than a transverse cross-sectional area of the fixed portion (e.g. 9a, 9ae, 9b, 9be, 19a, 19b).

With such a configuration, the amount of strain at the strain generation portion (e.g. 10, 10e) is increased and hence, the strain detecting portion (e.g. 7, 17) can detect strain in the axial direction with high accuracy.

In the above-mentioned aspect, the first member 2 and the second member 3 may include a fixing section for fixing the first member 2 and the second member 3 to an object to be detected.

With such a configuration, the first member 2 and the second member 3 can be directly fixed to the object to be detected by the fixing section.

In the above-mentioned aspect, the connecting member (e.g. 6, 6d, 6e, 16) may be formed to have a flat plate shape which extends along a plane substantially parallel to the axial direction.

With such a configuration, the connecting member (e.g. 6, 6d, 6e, 16) having a flat plate shape is disposed along the side surfaces of the first member 2 and the second member 3, thus reducing a projecting amount of the connecting member (e.g. 6, 6d, 6e, 16) in the cross-sectional direction which is orthogonal to the axial direction.

In the above-mentioned aspect, the strain detecting portion (e.g. 7, 17) may be configured to correct fluctuation in amount of strain caused by variation in ambient temperature.

Even only a variation in ambient temperature changes the amount of strain. However, with the above-mentioned configuration, the amount of strain is corrected by an amount which corresponds to the amount of variation in ambient temperature and hence, accuracy in detecting strain can be further enhanced.

In the above-mentioned aspect, the strain detecting portion (e.g. 7, 17) may be fixed to the connecting member (e.g. 6, 6d, 6e, 16) by screw-fastening.

In general, a strain gauge is fixed by adhesion in many cases so that it is necessary to pay attention to making an adhesive layer uniform. However, with the above-mentioned configuration, the strain detecting portion (e.g. 7, 17) is fixed by screw-fastening and hence ease of assembly can be enhanced.

In the above-mentioned aspect, a plurality of the strain detecting portions (e.g. 7, 17) may be arranged in a row on the strain generation portion (e.g. 10, 10e).

With such a configuration, it is possible to know whether or not one strain detecting portion (e.g. 7, 17 is in a normal state by comparing strain data from the one strain detecting portion (e.g. 7, 17) with strain data from another strain detecting portion (e.g. 7, 17). Even if a malfunction occurs in the one strain detecting portion (e.g. 7, 17), the robot can be quickly stopped safely using strain information from the remaining normal strain detecting portion (e.g. 7, 17) which is not malfunctioning.

In the above-mentioned aspect, the linear bearing 5 may be formed of a linear ball bearing 5a.

With such a configuration, even when the linear bearing 5 is mounted on a joint of a robot, on which loads in various axial directions act, such that the first member 2 and the second member 3 are supported so as to be relatively movable only in the axial direction along which the first member 2 and the second member 3 are movable, it is possible to easily prevent a load in the axial direction, along which the first member 2 and the second member 3 is movable, from acting on the strain generation portion (e.g. 10, 10e) of the connecting member (e.g. 6, 6d, 6e, 16).

In the above-mentioned aspect, the linear bearing 5 may be formed of a linear roller bearing.

In the above-mentioned aspect, the linear bearing 5 may be formed of a sliding bearing.

With such a configuration, a sliding bearing has a simple configuration and hence, costs can be reduced.

In the above-mentioned aspect, a plurality of the connecting members (e.g. 6, 6*d*, 6*e*, 16) may be provided at intervals in the moving direction, and the strain detecting portion (e.g. 7, 17) may be disposed on the strain generation portion (e.g. 10, 10*e*) of each of the connecting members (e.g. 6, 6*d*, 6*e*, 16).

With such a configuration, it is possible to easily form a strain sensor 1, 1*e* where a plurality of identical connecting members (e.g. 6, 6*d*, 6*e*, 16), each of which includes a strain detecting portion (e.g. 7, 17), are provided, thus outputting detection values of a plurality of systems.

In the above-mentioned aspect, the strain sensor 1 may include one or more reinforcing members configured to connect the first member 2 and the second member 3 with each other, each of the reinforcing members being fixed to the first member 2 and the second member 3.

With such a configuration, the reinforcing member reduces the amount of strain which acts on the strain generation portion (e.g. 10, 10*e*) and hence, compared to the case where the reinforcing member is not provided, the amount of strain which the strain detecting portion (e.g. 7, 17) detects is reduced. Accordingly, a detection value of the strain detecting portion (e.g. 7, 17) can be adjusted by the reinforcing member.

According to another aspect of the present invention, there is provided a multi-axial force sensor including a plurality of the strain sensors (e.g. 1, 1*a*, 1*b*, 1*c*, 1*d*, 1*e*) described in any one of the above-mentioned configurations, wherein each of the axial directions of a plurality of the linear bearings 5 is made to coincide with each of a plurality of detection directions along which axial forces are detected.

According to this aspect, in the multi-axial force sensor, the strain sensors are arranged such that the axial directions, along which the strain sensors (e.g. 1, 1*a*, 1*b*, 1*c*, 1*d*, 1*e*) can detect strain, are made to coincide with the plurality of detection directions, along which the axial forces can be detected. Accordingly, the multi-axial force sensor can detect axial forces in the respective detection directions with high accuracy.

According to still another aspect of the present invention, there is provided a robot on which the strain sensor (e.g. 1, 1*a*, 1*b*, 1*c*, 1*d*, 1*e*) according to any one of the above-mentioned configurations is mounted such that the predetermined axis A of the linear bearing 5 is made to coincide with a linear motion axis of the robot which includes a linear motion shaft.

According to yet another aspect of the present invention, there is provided a robot which includes: an arm; and a multi-axial force sensor configured to detect axial forces in respective detection directions, wherein the strain sensor (e.g. 1, 1*a*, 1*b*, 1*c*, 1*d*, 1*e*) according to any one of the above-mentioned configurations is mounted on at least a portion of the arm, the axial directions of the linear bearings of the strain sensors being made to coincide with a plurality of the detection directions of the multi-axial force sensor.

According to this aspect, it is possible to enhance accuracy in detecting respective axial forces which the multi-axial force sensor mounted on the arm detects. Further, a strain cancellation mechanism which uses a plurality of strain gauges is not required and hence, costs of the multi-axial force sensor can be reduced.

The invention claimed is:

1. A strain sensor comprising:
 a linear bearing including a first member and a second member which are supported such that the first member and the second member are relatively movable only in an axial direction of a predetermined axis;
 a connecting member including fixed portions, which are respectively fixed to the first member and the second member, and a strain generation portion which connects the fixed portions with each other; and
 a strain detecting portion disposed on the connecting member so as to be capable of detecting strain in at least a moving direction.

2. The strain sensor according to claim 1, wherein a transverse cross-sectional area of the strain generation portion is set smaller than a transverse cross-sectional area of the fixed portion.

3. The strain sensor according to claim 1, wherein the first member and the second member include a fixing section fixing the first member and the second member to an object to be detected.

4. The strain sensor according to claim 1, wherein the connecting member is formed to have a flat plate shape which extends along a plane parallel to the axial direction.

5. The strain sensor according to claim 1, wherein the strain detecting portion is configured to correct fluctuation in amount of strain caused by variation in ambient temperature.

6. The strain sensor according to claim 1, wherein the strain detecting portion is fixed to the connecting member by screw-fastening.

7. The strain sensor according to claim 1, wherein a plurality of strain detecting portions are arranged in a row on the strain generation portion.

8. The strain sensor according to claim 1, wherein the linear bearing is formed of a linear ball bearing.

9. The strain sensor according to claim 1, wherein the linear bearing is formed of a linear roller bearing.

10. The strain sensor according to claim 1, wherein the linear bearing is formed of a sliding bearing.

11. The strain sensor according to claim 1, wherein a plurality of the connecting members are provided at intervals in the moving direction, and
 the strain detecting portion is disposed on the strain generation portion of each of the connecting members.

12. The strain sensor according to claim 1, further comprising one or more reinforcing members configured to connect the first member and the second member with each other, each of the reinforcing members being fixed to the first member and the second member.

13. A multi-axial force sensor comprising a plurality of the strain sensors described in claim 1, wherein
 each of the axial directions of a plurality of the linear bearings is made to coincide with each of a plurality of detection directions along which axial forces are detected.

14. A robot on which the strain sensor according to claim 1 is mounted such that the predetermined axis of the linear bearing is made to coincide with a linear motion axis of the robot which includes a linear motion shaft.

15. A robot comprising:
 an arm; and
 a multi-axial force sensor configured to detect axial forces in respective detection directions, wherein
 the strain sensor according to claim 1 is mounted on at least a portion of the arm, the axial directions of the linear bearings of the strain sensors being made to coincide with a plurality of the detection directions of the multi-axial force sensor.

* * * * *